Sept 10, 1957 A. W. EDWARDS ET AL 2,806,182
LOAD PICKUP SECTIONALIZER
Filed May 27, 1953. 2 Sheets-Sheet 1

WITNESSES:
Robert C. Baird
F. V. Giolma

INVENTORS
Andrew W. Edwards &
Leonard V. Chabala.
BY
Ralph H. Swingle
ATTORNEY

INVENTORS
Andrew W. Edwards &
Leonard V. Chabala.
BY
Ralph H. Swingle
ATTORNEY

United States Patent Office 2,806,182
Patented Sept. 10, 1957

2,806,182

LOAD PICKUP SECTIONALIZER

Andrew W. Edwards, East McKeesport, and Leonard V. Chabala, Pittsburgh, Pa., assignors to Westinghouse Electric Corporation, East Pittsburgh, Pa., a corporation of Pennsylvania Application May 27, 1953, Serial No. 357,792

4 Claims. (Cl. 317—22)

Our invention relates generally to circuit interrupters, and it has reference in particular to polyphase load pickup sectionalizers.

Generally stated, it is an object of our invention to provide polyphase load pickup sectionalizing apparatus that is simple and inexpensive to manufacture.

More specifically, it is an object of our invention to provide for using a plurality of single-phase sectionalizers in a polyphase system, and for so connecting them as to provide for sectionalizing and load pickup operation.

One object of our invention is to provide in a simple and effective manner for utilizing three single-phase sectionalizers in conjunction with a single time delay relay for effecting load pickup operation in a three-phase circuit.

Yet another object of our invention is to provide for using a common time delay relay for controlling the energization of operating solenoids individual to each of three single-phase sectionalizers so as to effect operation thereof to pickup load after an extended outage, with a time delay which varies with the duration of the outage.

Other objects will, in part, be obvious and will, in part, be explained hereinafter.

In practicing our invention in accordance with one of its embodiments, three sepaarte sectionalizers, which are connected in the several phases of a polyphase system for operation in conjunction with a three-phase recloser, are each provided with individual solenoids and auxiliary switches connecting them for closing in response to voltage, and for holding the handles in the closed position when the contacts are open. A single time-delay relay is provided for simultaneously energizing the solenoids with a delay which varies with the duration of the period of deenergization preceding the restoration of voltage.

For a more complete understanding of the nature and scope of our invention, reference may be made to the following detailed description, which may be read in connection with the accompanying drawings, in which.

Figures 1, 2:
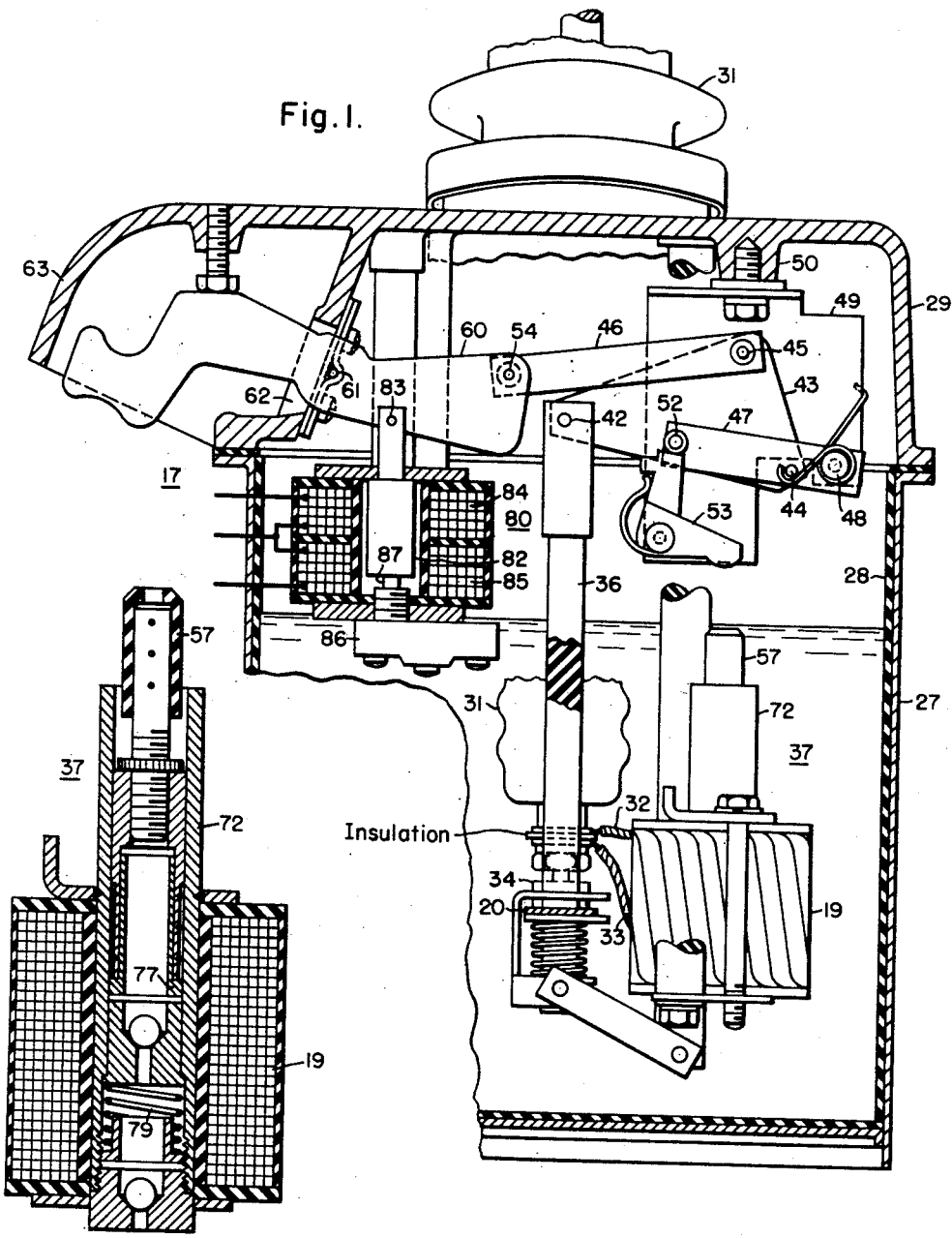
Figure 1 is a substantially central section through a sectionalizing switch of the type used in practicing our invention.
Fig. 2 is an enlarged sectional view of the counter shown in Fig. 1.

Referring particularly to Figs. 1 and 2 of the drawings, the reference numeral 17 may denote generally a sectionalizer of the type which is described in detail in the copending application of Andrew W. Edwards, Serial No. 253,405, filed October 26, 1951 and entitled "Automatic Load Pickup Switch" and is based on the structure disclosed in Patent No. 2,757,321, which issued on July 31, 1956, to James M. Wallace and Andrew W. Edwards and is referred to in said application. As may be seen, the sectionalizer comprises generally a metal tank 27 having an insulating liner 28 therein and surmounted by a cover casting 29. Mounted on the casting 29 are two insulating bushings, only one of which is shown, namely, the bushing 31 which extends through the cover and serves as a support for a stationary contact 34, there being two such contacts, the other one being mounted on the other bushing which is not shown because of the sectional nature of the drawing.

The stationary contacts are engaged by a moving or bridging contact 20 which is in the form of a bar slidably disposed on a contact rod 36 pivotally connected by means of a pivot 42 to one corner of a substantially triangular lever 43. The lever 43 is supported by means of a pivot 44 from a latch lever 47, which is pivotally connected by a pivot 48 to a support bracket 49 secured to a boss 50 depending from the cover casting 29. A bell crank lever 53 is pivotally supported on the bracket 49 for engaging a roller 52 to normally support the latch lever 47 in the position shown. The lever 43 is maintained in the position shown by means of a toggle linkage comprising a link 46 pivotally connected to the lever 43 by a pivot 45, and a lever 60, connected to lever 46 by means of a pivot 54 and pivotally mounted on the cover by means of a pivot 61 and having a handle portion extending through an opening 62 in the cover so as to be disposed under a hooded extension 63 of the cover where access may be had to it from the outside.

With the sectionalizer in the position shown, lever 60 and link 46 are in an overcenter toggle relation and maintain the bridging contact 20 in engagement with the stationary contacts. Separation of the contacts is effected by means of a counter 37 which has an operating winding 19 connected in series circuit relation with the circuit through the sectionalizer by means of conductors 32 and 33. The counter which is shown in detail in Fig. 2 is provided with an insulated extension 57 which is disposed to be progressively advanced in response to interruptions of an overcurrent by reason of the pumping action of a movable armature 77 and spring 79 disposed in a tubular member 72 extending through the operating winding 19.

In order to provide for closing the sectionalizer, an operating solenoid 80 is provided, having an armature 82 disposed to be connected by a pivot 83 to the lever 60 for actuating it to the position shown. The solenoid 80 may comprise separate coil sections 84 and 85 which are disposed to be selectively connected in different circuit relations by means of an auxiliary switch 86 having an operating plunger 87 actuated by the armature 82 for both closing the switch and holding the lever 60 in the closed position under predetermined operating conditions.

Figure 3:
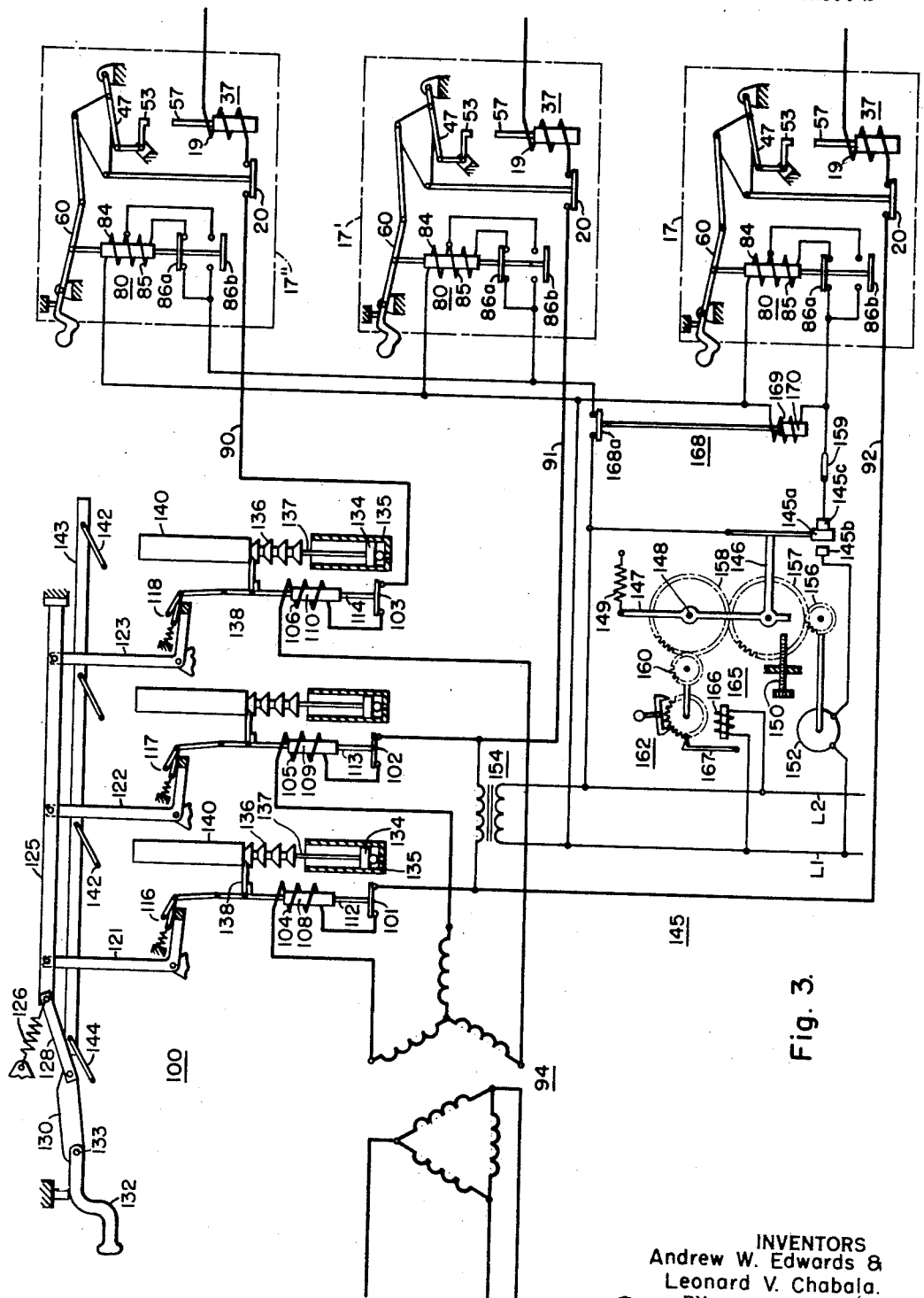
Fig. 3 is a diagrammatic view of a distribution circuit embodying the features of the invention.

Referring to Fig. 3 of the drawings, it will be seen that a plurality of sectionalizers 17, 17' and 17", which are of the type hereinbefore described, are disposed to be connected in series circuit relation with the several conductors 90, 91 and 92 of a three-phase circuit which is supplied with electrical energy from a transformer 94. A recloser 100 or other suitable automatic circuit breaker is disposed to control the connection of the conductors 90, 91 and 92 to the transformer 94. The recloser 100 may be of the type described in detail in the copending application Serial No. 103,898 of James M. Wallace et al., filed July 9, 1949, and entitled "Plural Phase Recloser." This recloser may comprise separate interrupter units for each phase represented by the contacts 101, 102 and 103. Each phase may be provided with an operating solenoid for actuating its respective contacts to the open position, as represented by the solenoids 104, 105 and 106, respectively. Armatures 108, 109 and 110 may be slidably disposed on contact rods 112, 113 and 114, respectively, for operating their respective contacts in response to overcurrents. Spring biased toggle mechanisms 116, 117 and 118 are provided for effecting a snap action of the contacts included.

In order to provide for manually opening the several contacts simultaneously, lever mechanisms 121, 122 and 123 are provided for individually actuating the toggle mechanisms 116, 117 and 118 to open the contacts. The lever mechanisms may be pivotally connected to a slidably mounted lockout bar 125 which is normally biased in a direction to open the contacts by a lockout spring 126. The lockout spring is normally rendered ineffective by means of a toggle linkage comprising pivotally connecting toggle levers 128 and 130 which are normally disposed in an overcenter toggle relation. A handle 132 may be connected to a shaft 133 on which the toggle lever 130 is supported for actuating the lever 130 in a counter-clockwise direction to break the toggle relation between the levers 128 and 130 so as to render the lockout spring 126 effective.

Each of the interrupters may be provided with a counter comprising a piston 134 disposed in a dashpot cylinder 135 and having flanges 136 mounted on extension 137 so as to be engaged by a pivotally mounted pawl 138 actuated by the contact rod of the particular interrupter. An insulated projection 140 at the top of extension 137 is disposed when sufficiently advanced to engage a radially projecting trip rod 142 connected to a common rotatable trip shaft 143.

When any interrupter operates, its pawl 138 advances the counter a predetermined distance, and when the interrupter recloses the counter resettles slowly. Should the interrupter reopen several times in close succession, the pawl 138 engages successive flanges 136 to advance the extension 140 sufficiently to engage and actuate its respective trip rod 142 so as to rotate the trip shaft 143. Under this condition, a trip rod 144 positioned under the junction of toggle levers 128 and 130 breaks the toggle relationship of these levers and permits the lockout spring 126 to move the lockout bar 125 to the left, thus opening all of the contacts of the recloser.

In order to provide for delaying reenergization of the several solenoids 80 of the sectionalizers 17, 17' and 17", a time-delay relay 145 is provided. The relay 145, which is shown as energized, may comprise a moving contact member 145a which is spring biased to engage a stationary contact member 145b when the relay is deenergized, and may be actuated to engage a normally open contact member 145c when the relay is energized. A contact actuating member 146 projects from adjacent one end of a lever 147 which is pivotally mounted on a pivot 148 and is biased in a clockwise direction by a spring 149, to engage an adjustable stop 150. A motor 152 is normally connected through the normally closed contact member 145b of the relay to a source of electrical energy which is represented by a transformer 154. The motor is connected through a suitable reduction gearing to a pinion 156 for actuating it to rotate a gear 157 which is pivotally mounted on the lever 147 adjacent its free end and meshes with a similar gear 158 pivotally mounted on the pivot 148. A pinion 160 meshing wtih the gear 158 is connected to a suitable escapement mechanism 162 so as to permit only delayed rotation of the gear 158. A clutch 165 comprising a solenoid 166 and a pawl 167 actuated by the solenoid to prevent operation of the escapement mechanism is energized whenever voltage is applied to the transformer 154. This prevents rotation of the gear wheel 158, and permits the motor 152 to move the lever in a counterclockwise direction so as to actuate contact member 145a into engagement with the normally open contact member 145c when voltage is applied for a sufficient length of time. A switch 159 is provided for disconnecting the sectionalizers from the time delay relay. This switch is normally closed.

If voltage is removed from the transformer 154, the solenoid 165 is deenergized and the escapement mechanism 162 is activated permitting spring 149 to slowly actuate the lever 147 in a clockwise direction and permit contact member 145a to disengage contact member 145c and reengage contact member 145b.

In order to provide for collectively operating the sectionalizers 17, 17' and 17" as load pickup switches, a control relay 168 may be provided, having an operating winding 169 for actuating armature 170 to close contact 168a for connecting the solenoids 80 of the sectionalizers 17' and 17" to the transformer 154. The operating winding 169 may be connected in parallel with the solenoid 80 of sectionalizer 17 so as to be energized for operating relay 168 and effecting energization of the closing coil sections 84 of sectionalizers 17' and 17" whenever the closing coil section 84 of sectionalizers 17 is energized and for energizing both sections 84 and 85 of sectionalizers 17' and 17" when both coil sections of the sectionalizer 17 are energized for holding the levers 60 in the closed position.

With the switch 159 closed, the recloser 100 and the sectionalizers are in the closed position and sections 84 and 85 of the solenoids 80 of the sectionalizers are energized through their contacts 86a. The time delay relay 145 is in the operated position with contact member 145a engaging the normally open contact member 145c. The motor 152 is deenergized and the clutch pawl 167 is actuated by the solenoid 166 to render the escapement mechanism 162 inoperative, thus maintaining the relay in the closed position. Should a fault occur on the system beyond the sectionalizers such that the recloser 100 operates a plurality of times in close succession, the counters 37 will be advanced to engage their respective bell crank levers 53 and release the contacts 20 by removing the supports for levers 47. When the contacts 20 open, handles 60 rotate counterclockwise to the open position and the auxiliary switch contacts 86b close, energizing the closing coil sections 84 so that levers 60 are actuated to the closed position although the contacts 20 remain open. Contact members 86a are now closed to connect sections 84 and 85 of the solenoids in series so as to hold the handles in the closed position as shown. Since the trip members 57 reset slowly and will not have had sufficient time to return to the deenergized position, the bell crank levers 53 will remain in a released or counter-clockwise position, in which they do not provide support for the levers 47, thus preventing reset of the latch levers 47 so that the sectionalizers are locked with the contacts 20 in the open position and perform a normal sectionalizing function and permitting the recloser to close and stay closed. The sectionalizers may be reclosed by actuating their handles to the open position to permit levers 47 to be supported by bell crank levers 53 when the counters 37 have reset after a slight delay and releasing them or opening the switch 159 connected to 145c and reclosing it, whereupon the solenoids 80 will be effective to reclose the contacts 20.

Should a fault condition occur which causes lockout of the recloser 100, so that voltage is removed from the conductors 90, 91 and 92 for a relatively long interval, the time-delay relay 145 will be deenergized. The clutch pawl 167 is released and under such conditions the spring 149 is effective to slowly move lever 147 in a clockwise direction delayed by the escapement mechanism 162. Whenever the recloser is reclosed to apply voltage to the transformer 154, it will require a time interval of approximately the duration of the period of deenergization for the motor 152 to slowly actuate the lever 147 in a counterclockwise direction to effect reengagement of contact members 145a and 145c.

The fault which occasioned operation of the recloser 100 must have been between the sectionalizers and the recloser or else operation of the sectionalizers would have prevented the recloser from locking out. Accordingly, the sectionalizers will not have been subjected to the fault current and will remain in the closed position. Should the accumulated load on the circuits, due to a loss in diversity during the outage, not be sufficient to cause reopening of the recloser 100, the circuit will be restored when the recloser is reclosed. Should the loss of diversity, however, result in a sufficient overload upon reclosing the recloser, that it immediately trips out, the sectionalizers will be subjected to the interruption of such overload and will count operations of the recloser. When the recloser opens the third time, the sectionalizers will open in the usual manner, but when the recloser closes the third time, the sectionalizers will be in the open position, thus disconnecting that portion of the load which lies beyond them. This portion of the load being removed from the recloser, it will normally be able to carry the load current occasioned by the remaining portion of the load. Because the time-delay relay 145 in effect ran down during the outage, voltage will not be applied to the operating solenoids of the sectionalizers until the motor 152 has operated for a sufficient period of time to again actuate contact member 145a to engage normally open contact member 145c.

This requires a period of time which is substantially equal to the period during which voltage was lost, up to a maximum of about thirty minutes. When this time is attained, the closing coil section 84 of sectionalizer 17 will be energized through contact member 86b in parallel with the operating winding 169 of auxiliary relay 168. Closing coil sections 84 of sectionalizers 17' and 17" will be energized through contact member 168a of the auxiliary relay. Since the counters 37 have had sufficient time to reset, the bell crank levers 53 and latch levers 47 will be reset to the position shown and the operating solenoids will, therefore, be effective to close contact members 20, thus completing the circuit connections for the several phases.

From the above description and the accompanying drawings, it will be apparent that we have provided in a simple and effective manner for operating a plurality of sectionalizing switches in a polyphase circuit. Apparatus embodying the features of our invention is simple and inexpensive to manufacture and is reliable and effective in operation. Only a single time-delay relay is required for a plurality of sectionalizers, thus greatly reducing the expense of the installation.

While the auxiliary relay is shown as controlling the energization of two of the sectionalizers since this enables a standard single phase sectionalizer with its time delay relay to be used without any rewiring, it will be realized that all three sectionalizers may be controlled by the auxiliary relay if desired.

Since certain changes may be made in the above described construction, and different embodiments of the invention may be made without departing from the spirit and scope thereof, it is intended that all the matter contained in the above description and shown in the accompanying drawings, shall be considered as illustrative and not in a limiting sense.

We claim as our invention:

1. Load pickup apparatus comprising, a plurality of sectionalizing switches each having separable contacts biased apart, an operating mechanism for said contacts including a double toggle linkage having a handle lever operable to open and close said contacts and a latch lever releasable to open said contacts independently of the handle lever, said latch lever being normally maintained in a position to hold the contacts closed by releasable means, a counter member for each switch advanced by closely successive interruptions of an overcurrent through its switch to release said releasable means during the last of a plurality of such operations, solenoid means individual to each switch, means linking each of the solenoid means with the handle lever of its switch, auxiliary switch means individual to each switch operable to different positions in accordance with the handle position to connect the solenoid means to operate the handle lever in a direction to close its contacts when the handle is in an open position and reconnect the solenoid to maintain the operating mechanism in the closed position when the handle is in a closed position, and time delay means operable with said auxiliary switch means to connect said solenoid means to a source of electrical energy, said time delay means having a member biased to move slowly to disconnect the solenoid means from the source when voltage is removed and means operable upon the application of voltage to oppose said bias and move said member slowly in a direction to connect the solenoid means to the source.

2. Load pickup apparatus comprising, a plurality of single-phase sectionalizing switches each having separable contacts in the different phases of a polyphase circuit, an operating mechanism including a handle and a link connected between the handle and one of said contacts to provide an overcenter toggle lever arrangement operable to maintain the contacts closed, releasable means operable to break said toggle arrangement, a counter having a member advanced by closely successive interruptions of an overcurrent through the contacts to effect release of said releasable means during an interruption to open said contacts independently of the handle, solenoid means connected to the handle of each switch to actuate the mechanism to close said contacts, a time-delay device individual to one of the switches having a movable contact operable to connect the solenoid means of said switch to a source of electrical energy, a movable member biased to an inoperative position having a lost motion connection with the contact member, and a motor connected in driving relation with said movable member, and relay means connected to the source of electrical energy by the contact member of the time delay device operable to connect the other solenoid means to the source.

3. In polyphase apparatus, a plurality of single-phase sectionalizing switches, each having separable contacts with a toggle lever mechanism movably supporting one of them including releasable latch means operable to release the toggle lever mechanism, said toggle lever mechanism having one of the levers with a projection providing manual means to operate the movable contact when the releasable means is in latching position, solenoid means individual to each switch having an armature connected to each of said one levers to actuate it in a direction to close said contacts, auxiliary switch means individual to each solenoid means operable in accordance with the position of its armature to connect different portions of the solenoid means for energization in the open and closed positions of the armature regardless of contact position, a counter individual to each switch, having a member advanced by closely successive interruptions of an overcurrent to operate said releasable means, and means including a common time delay device responsive to voltage and said auxiliary switch means for connecting said different portions of the solenoid and effecting operation of said solenoid means to respectively move said one lever to the closed position and hold it in said position.

4. Polyphase load pickup apparatus comprising, a sectionalizing switch individual to each phase having separable contacts, a toggle lever mechanism having a plurality of levers including a handle operable to open and close said contacts, releasable means operable to release said toggle lever mechanism and open said contacts independently of the handle, a solenoid individual to each switch having an armature connected to the one of the toggle levers having the handle to actuate it to close said contacts, a time-delay device common to individual to one switch having a movable contact member and a contact actuating member advanced slowly to an operating position in response to a predetermined voltage, said member being biased to return slowly toward an initial position when voltage is removed, a relay energized and deenergized by the time delay contact member, an auxiliary switch individual to each sectionalizing switch actuable to two positions in accordance with the position of the armature, circuit means including the contact of the time-delay device and contacts of the auxiliary switch of said one sectionalizing switch connecting a portion of the solenoid thereof to a source of electrical energy to close the switch when it is open and connecting the whole solenoid to a source when the armature is in its operated position independently of the condition of the releasable means, and circuit means including contacts of the relay and the auxiliary switches of the other sectionalizing switches connecting a portion and the whole of their solenoids to the source in a like manner.

References Cited in the file of this patent

UNITED STATES PATENTS

| | | |
|---|---|---|
| 1,272,444 | Holliday | July 16, 1918 |
| 1,272,447 | Jacobs | July 16, 1918 |
| 1,795,198 | Connell | Mar. 3, 1931 |
| 2,068,620 | Spurgeon | Jan. 19, 1937 |
| 2,563,136 | Schindler | Aug. 7, 1951 |